D. B. WASSON.
VEHICLE TOP SECURING DEVICE.
APPLICATION FILED MAY 23, 1912.
1,054,475.
Patented Feb. 25, 1913.
2 SHEETS—SHEET 1.
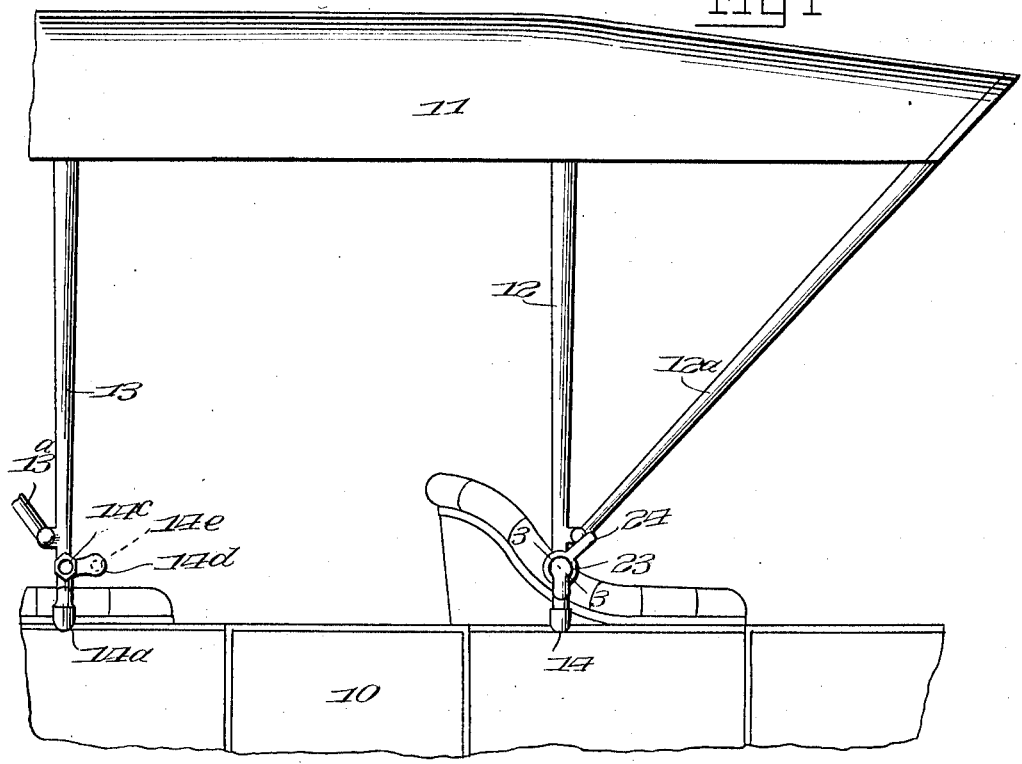
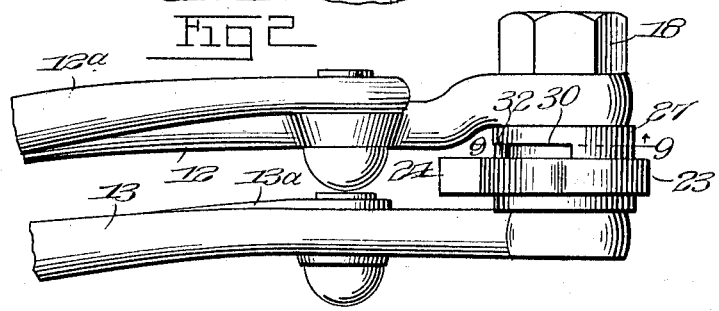
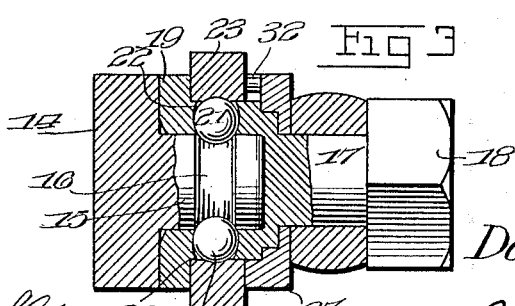
Witnesses
Inventor
David B. Wasson
By Victor J. Evans
Attorney D. B. WASSON.
VEHICLE TOP SECURING DEVICE.
APPLICATION FILED MAY 23, 1912.
1,054,475.
Patented Feb. 25, 1913.
2 SHEETS—SHEET 2.
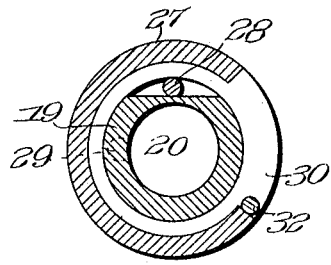
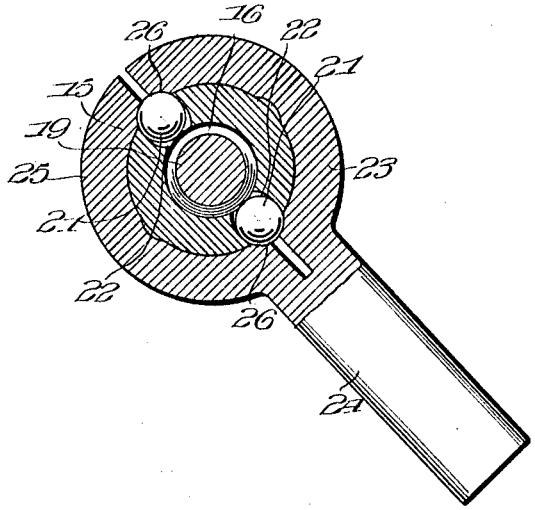
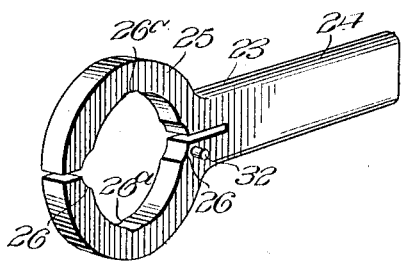
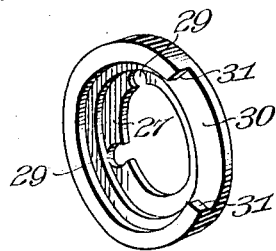
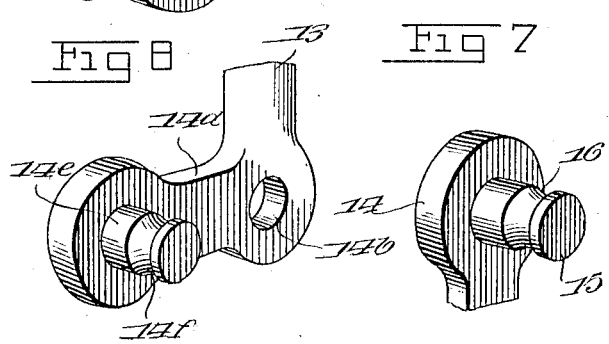
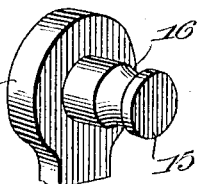
Inventor
David B. Wasson
Witnesses
By Victor J. Evans
Attorney ed Feb. 25, 1913.
UNITED STATES PATENT OFFICE.

DAVID B. WASSON, OF BRADFORD, PENNSYLVANIA.

VEHICLE TOP-SECURING DEVICE.

1,054,475. Specification of Letters Patent. Patent

Application filed May 23, 1912. Serial No. 699,259.

*To all whom it may concern:*

Be it known that I, DAVID B. WASSON, a citizen of the United States, residing at Bradford, in the county of McKean and State of Pennsylvania, have invented new and useful Improvements in Vehicle Top-Securing Devices, of which the following is a specification.

An object of the invention is to provide a device for securing a vehicle top or covering in open or folded position on a vehicle so that the vehicle top or parts connecting the same with the vehicle will not rattle when the vehicle is operated over the ground.

The invention embodies, among other features, a device for locking the vehicle top in open position on the vehicle in such a manner as to prevent any rattling of the vehicle top, the device being provided to constitute the connection between the bows of the vehicle top and the body of the vehicle, whereas, when the vehicle top is moved into folded position on the vehicle, the device is also adapted to retain the vehicle top in locked relation to the body of the vehicle, thus also preventing any rattling of the vehicle top when the same is in folded position.

My device is particularly adaptable for use in connection with automobiles and the vehicle tops or coverings thereof, although it will be understood that the securing device can be adapted for many other purposes and also used in connection with the ordinary carriages or buggies having tops or coverings thereon.

In the further disclosure of the invention reference is to be had to the accompanying drawings constituting a part of this specification, in which similar characters of reference denote corresponding parts in all the views, and in which:

Figure 1 is a fragmentary side elevation of a vehicle provided with a top, the top being shown in open position and locked in open position with my securing device; Fig. 2 is an enlarged fragmentary plan view showing the arrangement of the base and my securing device when the vehicle top is in folded position; Fig. 3 is an enlarged transverse sectional view taken on the line 3—3 in Fig. 1; Fig. 4 is a vertical sectional view taken on the line 4—4 in Fig. 3, the handle of the operating member being shown in elevation and the operating member being in unlocked position; Fig. 5 is a perspective view of the operating member; Fig. 6 is a perspective view of the ring; Fig. 7 is a perspective view of the forward supporting member of the vehicle; Fig. 8 is a fragmentary perspective view of the lateral extension of one of the rear bows; and Fig. 9 is a vertical sectional view taken on the line 9—9 in Fig. 2.

Referring to the views, and more particularly to Fig. 1, I disclose a vehicle body 10 adapted to receive over the same a suitable top or covering 11, a front bow 12 being provided on each side of the top 11 and having connection therewith and a rear bow 13 being provided on each side of the top 11 and having connection therewith, an auxiliary front bow $12^a$ being arranged for connection with the top 11 and having pivotal connection with the front bow 12 adjacent the lower end thereof, an auxiliary rear bow $13^a$, similar to the auxiliary front bow $12^a$, being provided for pivotal connection with the rear bow $13^a$ adjacent the lower end thereof and also having connection with the top 11 at the rear end thereof, it being understood that the bows 12, 13, $12^a$ and $13^a$ are provided in pairs, one of the mentioned bows being provided for connection with each side of the top 11 to properly support the same over the vehicle body 10.

A supporting member 14, disclosed in Figs. 1 and 7, is secured to the vehicle body 10 and is provided with a head 15 having a peripheral groove 16 therein, the lower end of the front bow 12 being adapted for connection with the supporting member 14 in a manner that will be hereinafter more fully disclosed. In a similar manner, a supporting member $14^a$ is secured to the vehicle body 10 near the rear end thereof and the lower end of the rear bow 13 has pivotal connection with the member $14^a$, a portion of the rear bow 13 being shown in Fig. 8 as provided with an opening $14^b$, through which a suitable bolt $14^c$ is passed to pivotally connect the bow 13 to the supporting member $14^a$, the mentioned bow 13 being provided with a lateral extension $14^d$ provided with a lateral head $14^e$ having a peripheral groove $14^f$ thereon, the mentioned head $14^e$ being similar to the head 15 of the supporting member 14, as shown in Figs. 7 and 8.

Now when the vehicle top 11 is in open position as shown in Fig. 1, the bow 12 will be connected to the supporting member 14 and the bow 13 will have connection with the supporting member 14ᵃ. Now when it is desired to move the vehicle body into folded position, the bow 12 is disengaged from the supporting member 14 and is connected to the supporting member 14ᵃ through the medium of the extension 14ᵃ, so that the top 11 will lie on the rear upper portion of the vehicle body 10 in folded position.

A threaded shank 17 is provided for connection with the lower end of the front bow 12, the said shank being extended through the lower end of the bow and secured by a nut 18, mounted on the threaded portion of the shank, a flanged head 19 being formed on the other end of the shank 17 and having an opening formed therein to constitute a socket 20 adapted to receive the head 15 of the supporting member 14 when the vehicle top is to be supported in open position, the mentioned socket 20 being also adapted to receive the head 14ᵉ of the extension 14ᵈ formed at the lower end of the rear bow 13, when the vehicle top is secured in folded position.

A plurality of balls 21 are loosely mounted in openings 22, formed in the head 19, the inner extremities of the openings being restricted so as to permit the balls to extend into an opening forming the socket 20, the restriction of the inner ends of the openings 22 being provided to prevent the balls from moving entirely into the opening forming the socket 20, as will be readily understood by referring to the views, it being further understood that the balls 21 are freely movable in the openings 22 thereof and are arranged in diametrical relation on the head 19, as clearly shown in Fig. 4.

Mounted to encircle the head 19 and freely movable to turn thereon is an operating member 23, terminating in a handle 24, and having formed therewith a collar 25, the mentioned collar being split and the mentioned operating member being preferably made of a material which, together with the splitting of the collar 25, will give the collar a slight flexibility, as will be readily understood. The inner face of the collar is substantially circular and provided with diametrically arranged recesses 26, 26ᵃ, the mentioned recesses being adapted to receive portions of the balls 21 therein, the balls 21 being adapted to extend into the recesses 26 when the operating member 23 is in unlocked position and adapted to extend into the recesses 26ᵃ when the operating member 23 is in locked position, it being readily understood that when the operating member 23 is turned on the head 19 so that the recesses 26 therein aline with the balls 21, the balls will readily move into the recesses and beyond the inner periphery of the inner face of the head 19, thus permitting the insertion of the head 15 on the supporting member 14, in the socket 20. Now when this has been accomplished, the operating member 23 is turned on the head 19 and the balls 21 will be forced out of the recesses 26 when the same are moved out of alinement with the balls, thus causing the balls to extend into the groove 16 in the head 15 of the supporting member, thus locking the head 15 in the socket 20. In a similar manner when it is desired to lock the head 14ᵉ in the socket 20, the head 14ᵉ is moved into the socket when the balls 21 aline with the recesses 26, after which the operating member 23 is turned, thus moving the recesses 26 out of alinement with the balls and causing the balls to operate in the groove 14ᶠ of the head 14ᵉ, thus locking the mentioned head 14ᵉ in the socket 20.

In order to limit the swinging or rotating movement of the operating member 23 for the purpose of substantially securing the operating member in locked position, a ring 27 is mounted to encircle the shank 17, the ring being held in rigid position on the head 19 of the shank, by a pin 28 extended from the head to pass through one of a plurality of openings 29 in the ring 27, the mentioned ring being provided with a cut away portion 30, forming stop lugs 31 thereon, the said stop lugs being adapted to be engaged by a pin 32 extended from the face of the operating member 23 so that when the operating member is actuated, the mentioned pin will move therewith and in the cut away portion of the ring 27, thus limiting the swinging or rotating movement of the operating member, the mentioned pin being adapted to abut against the stop lugs 31 formed by the cut away portion 30 on the ring 27, it being readily seen that when the pin 32 engages the lower stop lug 31, the recesses 26 in the collar 25 of the operating member 23 will register with the balls 21 in the head 19 so that the head 14ᵉ or 15 of the supporting member 14 or 14ᵃ can be removed from or inserted into the socket 20, it being further seen that when the operating member 23 is swung on the head to move the pin 32 into engagement with the upper stop lug, the balls 21 will be engaged by the inner face of the collar 25, thus pressing the balls inwardly into the groove 14ᶠ or 16, formed in the head 14ᵉ or 15 of the supporting member 14ᵃ or 14, thus locking the head 14ᵉ or 15 in the socket 20. It should be noted that the cut away portion 30 is made sufficiently large to permit the operating member 23 to swing a distance of approximately ninety degrees, so that when the operating member is swung upwardly into locked position, portions of the balls 21 will swing into the recesses 26ᵃ, thus substantially securing the locking member in locked position, it being readily seen that by simply pressing downwardly on the handle 24 of the operating member, the balls will be forced out of the recesses 26ª so that a further pressure on the handle 24 will cause the operating member to rotate on the head 19, thus moving the operating member into unlocked position and when the operating member is in unlocked position the recesses 26 will aline with the balls 21, thus permitting the balls to extend into the recesses and out of the groove of the head 14ᵉ or 15, with which the socket 20 has connection. It should also be noted that the ring 27 is made sufficiently large to overlap a face of the collar 25, and the flange on the head 19 is also of a sufficient diameter to overlap the other face of the collar 25, thus retaining the operating member 23 in position on the head 19, between the flange of the head and the ring 27.

By referring to Fig. 6 it will be seen that a plurality of openings 29 are provided in the ring 27. It should be noted that this construction is employed in order that the ring 27 may be used in connection with my device when the same is applied to the right side of the vehicle as well as when the same is applied to the left side of the vehicle, one of the openings 29 being employed when the ring is mounted on one side of the vehicle and the other opening being employed when the ring is mounted on the other side of the vehicle.

Now assuming that the vehicle top 11 is in the position shown in Fig. 1, when it is desired to move the same into folded position, the operating member 23 is swung downwardly into unlocked position, thus permitting the removal of the head 15 from the socket 20, and the front bows 12, 12ª with the front part of the vehicle top 11 are now carried rearwardly so that the head 14ᵉ will be received in the socket 20 of the securing device, after which the operating member 23 is returned to locked position and the vehicle top 11 can then be swung downwardly onto the rear part of the vehicle and will now lie in folded position thereon, it being readily seen that by providing my securing device to complete the connection of the top with the vehicle, when the same is in folded as well as unfolded position, any rattling of the vehicle top or the parts thereof relatively to the vehicle will be prevented and the operation of moving the vehicle top into folded or unfolded position can be easily and quickly accomplished.

A large number of the vehicle tops now used on automobiles are connected to the vehicle body thereof by means of a cotter pin and chain, thus necessitating the removal and replacing of the cotter pin each time that the vehicle top is moved from one position to another, whereas in the use of my device, the operation consists merely in moving the operating member into unlocked position, removing the front bows from the front supporting members and the rear supporting members of the vehicle body and then returning the operating member into locked position to relock the vehicle top on the vehicle so that the same will lie in folded position on the vehicle and will not rattle as the vehicle proceeds over the ground.

As mentioned heretofore, although I preferably employ my securing device in connection with automobiles and the vehicle tops thereof, the device can also be adapted for many other purposes and I do not limit myself to the particular construction and arrangement disclosed herein, the scope of the invention being defined in the appended claims.

Having thus described my invention, I claim:

1. In combination with a bow of a vehicle top and a supporting member of a vehicle body, a shank mounted on the said bow, a head formed with the said shank and provided with a central opening constituting a socket, a grooved head formed on the supporting member and adapted to be received in the said socket, an operating member mounted to turn on the said head and provided on the inner face thereof with diametrically arranged recesses, balls mounted on the said head and adapted to normally repose in the recesses in the said operating member, the said balls being movable into the groove of the head of the supporting member when the said operating member is rotated on the said head, a ring mounted to encircle the said shank, a pin extended from the said head and passing through an opening in the said ring to retain the ring in rigid position relatively to the head, stop lugs formed on the said ring by cutting away a portion thereof, a pin extended from the said operating member and movable in the cut away portion of the ring to engage the said stop lug and limit the swinging movement of the operating member, and a nut for securing the said shank to the brace of the said vehicle.

2. In a device of the class described, the combination with a bow of a vehicle top and a supporting member of a vehicle body, of a shank mounted on the said bow, a head on the said shank and provided with a central opening forming a socket, a grooved head on the supporting member of the said vehicle top and adapted to be received in the said socket, balls mounted on the said head and movable into the groove of the head of the supporting member, an operating member mounted to swing on the said head and adapted to engage the said balls to move the same into the groove in the head of the said supporting member, and means engaging the head of the said shank to limit the swinging movement of the said operating member.

3. In a device of the class described, the combination with a bow of a vehicle top and a supporting member of a vehicle body, of a shank mounted on the said bow, a head on the said shank and provided with a central opening forming a socket, a grooved head on the supporting member of the said vehicle top and adapted to be received in the said socket, balls mounted on the said head and movable into the groove of the head of the supporting member, an operating member mounted to swing on the said head and adapted to engage the said balls to move the same into the groove in the head of the said supporting member, and a ring engaging the said head and adapted to be engaged by the operating member to limit the swinging movement thereof.

4. In a device of the class described, the combination with a supporting member, of a shank provided with a socket adapted to receive the supporting member, balls loosely mounted on the shank and movable to engage the supporting member, and an operating member mounted to turn on the said shank and provided with recesses adapted to aline with the said balls and receive the balls when the said operating member is in unlocked position, the said operating member being movable to force the said balls into the said socket and into engagement with the said supporting member when the said recesses are moved out of alinement with the said balls.

5. In a device of the class described, the combination with a shank provided with a socket adapted to receive a supporting member, of balls mounted on the said shank and freely movable thereon, an operating member mounted to turn on the said shank and movable to engage the said balls and force the same into locked engagement with the said supporting member, a ring on the shank, and stop lugs on the said ring and adapted to be engaged by the operating member to limit the swinging movement thereof.

In testimony whereof I affix my signature in presence of two witnesses.

DAVID B. WASSON.

Witnesses:
F. A. HOSTER,
BURNETT S. JONES.